P. BROWN & F. J. BOSTOCK.
INDEXING OR DIVIDING MECHANISM FOR CHUCKS.
APPLICATION FILED OCT. 8, 1913.

1,100,526.

Patented June 16, 1914.

Witnesses
W. Allen
W. E. Allen

Inventors
Percy Brown, and
Francis J. Bostock
by Herbert W. J. Jenner
Attorney

UNITED STATES PATENT OFFICE.

PERCY BROWN AND FRANCIS JOHN BOSTOCK, OF HUDDERSFIELD, ENGLAND.

INDEXING OR DIVIDING MECHANISM FOR CHUCKS.

1,100,526.  Specification of Letters Patent.  Patented June 16, 1914.

Application filed October 8, 1913. Serial No. 794,049.

*To all whom it may concern:*

Be it known that we, PERCY BROWN and FRANCIS JOHN BOSTOCK, subjects of King George V of Great Britain, residing at Huddersfield, in the county of York, England, have invented certain new and useful Improvements in Indexing or Dividing Mechanism for Chucks, of which the following is a specification.

This invention has reference to chucks for centering and gripping the work spindle in machines, such for instance, as grinding machines, wherein the work not only requires to be rotated while being operated upon, but also requires to be periodically divided or indexed to present a fresh portion of its surface opposite the tool or cutter.

The invention relates more particularly to the construction and arrangement of mechanism combined with the usual indexing mechanism whereby a finer division than that provided for by the said indexing mechanism can be obtained, and consists in the improved construction and arrangement of such mechanism hereinafter described with reference to the accompanying drawing in which:—

Figure 1:
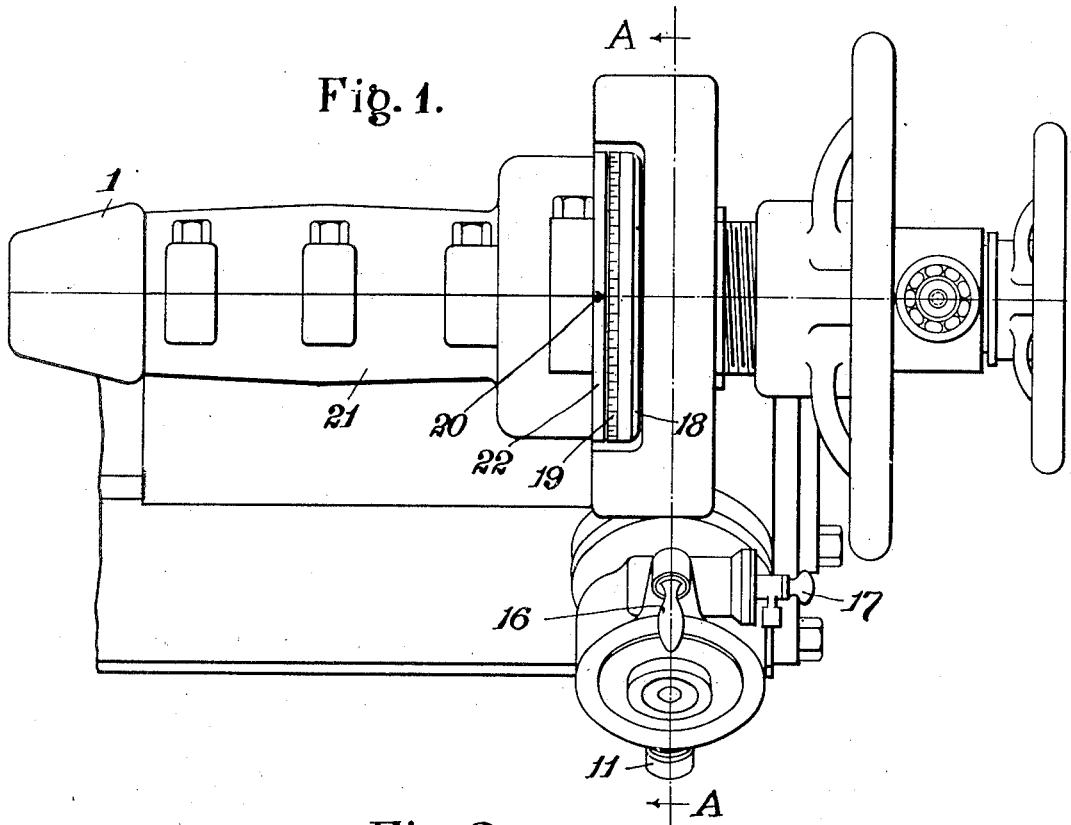
Figure 2:
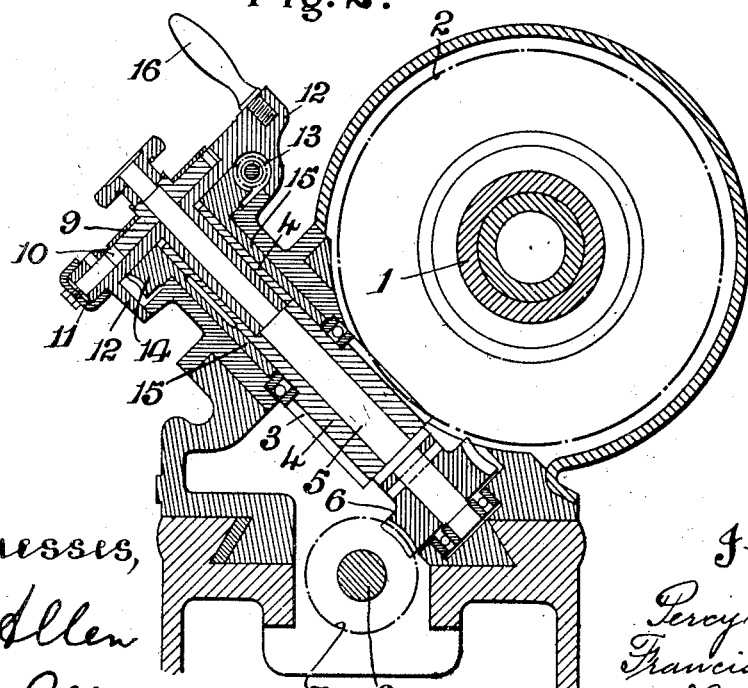

Figure 1 is a plan view of a chuck having the improvements applied thereto, and Fig. 2 is a sectional elevation taken on the line A—A, Fig. 1.

According to our invention, the hollow rotatably mounted chuck spindle 1 has fast upon it a worm wheel 2 with which meshes a worm 3 integral with or fast on a sleeve 4. Extending within the sleeve 4 is a shaft or spindle 5 whose lower end carries a worm wheel 6 meshing with and driven by a worm 7 fast on a suitably driven shaft 8. The upper end of the shaft 5 has fast upon it a peripherally notched indexing disk 9, and a finger 10 carried in a boss 11 on a revolving bracket or support 12 engages in one of the notches in the disk 9 and revolubly connects the support 12 thereto. Mounted in bearings in the support 12 is a worm 13 which meshes with a worm wheel 14 fast to or integral with a sleeve 15 which said sleeve is keyed to the upper end of the sleeve 4. Motion from the shaft 5 is thus transmitted through the disk 9, finger 10, support 12, worm 13, worm wheel 14, sleeve 15, and sleeve 4 to the worm 3, to cause the chuck to be rotated. To index the work, the finger 10 is removed from engagement with the disk, and the support is rotated by means of the handle 16 to bring the finger opposite the required notch in the disk in the usual way. The rotation of the support carries around with it the worm 13 and the latter, by its engagement with the worm wheel 14 causes the sleeve 4 to rotate the worm 3 and turn the worm wheel 2 and the chuck, through the desired portion of a revolution.

By rotating the worm 13 by means of a knob 17 (Fig. 1) fast on its spindle, the worm wheel 14 can be rotated independently of the support and index disk and this enables an independent fine or intermediate adjustment to be given to the work.

In order to provide a check on the indexing or dividing of the work, so that unskilled labor may be employed, we attach to the worm wheel 2 a disk 18 having a flange 19 the periphery of which is suitably divided and marked with numbers corresponding to the parts of a circle into which the work may require to be divided. Operation of the index mechanism, to move the work through a portion of a revolution, will cause the disk 18 to be moved to present the corresponding number opposite a fixed indicating mark, such as an arrow 20, marked on the part 22 of the housing 21, thus enabling the operator to see at a glance if the index finger 10 has been moved past the proper number of notches in the index disk 9, or the worm 13 rotated to the predetermined extent.

The details of construction of our improvements may be varied if desired.

Having thus described our invention, what we claim as new and desire to secure by Letters Patent is:—

1. The combination, with a revoluble chuck, a revoluble sleeve, and driving mechanism operatively connecting the said chuck and sleeve; of a driving shaft arranged in the said sleeve and provided with means for revolving it, a support journaled concentric with the sleeve and operatively connected with it so that they revolve simultaneously, an index disk secured to the driving shaft, and a movable finger normally coupling the index disk to the said support and permitting the support and sleeve to be revolved by hand, independently of the driving shaft, to adjust the chuck, when the finger is disconnected from the index disk.

2. The combination, with a revoluble chuck, a revoluble sleeve, and driving mechanism operatively connecting the said chuck and sleeve; of a driving shaft arranged in the said sleeve and provided with means for revolving it, a support journaled concentric with the sleeve, a worm wheel which revolves with the said sleeve, an adjusting worm mounted to revolve in the said support and gearing into the said worm and constraining the sleeve and support to revolve simultaneously, an index disk secured to the driving shaft, and a movable finger normally coupling the index disk to the said support and permitting the support and sleeve to be revolved by hand, independently of the driving shaft, to adjust the chuck, when the finger is disconnected from the index disk.

In testimony whereof we affix our signatures in the presence of two witnesses.

PERCY BROWN.
FRANCIS JOHN BOSTOCK.

Witnesses:
T. E. WHITELEY,
C. E. HINCHLIFF.